United States Patent Office 3,412,061
Patented Nov. 19, 1968

3,412,061
WATER-DISPERSED HIGH-SOLIDS-CONTENT ADHESIVES OF ELASTOMERS AND TACKIFIERS AND THE METHOD OF PRODUCTION OF THE AQUEOUS DISPERSION
John Jacob Drukker, Wyckoff, N.J., assignor to The Flintkote Company, New York, N.Y., a corporation of Massachusetts
No Drawing. Filed Nov. 3, 1964, Ser. No. 408,649
5 Claims. (Cl. 260—29.7)

ABSTRACT OF THE DISCLOSURE

A process for producing improved aqueous dispersions of tackified rubber adhesives having high solids content is taught involving first providing sufficient surface active agents in a rubber latex to disperse subsequently added tackifier resins and thereafter dispersing tackifier resins in the latex in an amount sufficient to tackify the rubber of the latex.

---

This invention relates to a method of preparing high-solids-content aqueous dispersions of tacky adhesives and especially to the preparation of such adhesives in the form of aqueous dispersions of natural or synthetic rubbers or mixtures thereof or like elastomers and resinous, or polymeric, tackifiers therefor and the resulting novel adhesives.

It is known that natural or synthetic rubber, and like elastomer, adhesives are lacking in tackiness, high early strength and pressure sensitivity, and that these properties can be imparted to such materials by adding thereto tackifier resins, or the like. Some of the advantages of aqueous dispersions of such adhesives in certain fields of application also are well known. Heretofore, however, one has had the choice of relatively low-solids-content aqueous dispersions of tacky adhesives such as disclosed in Geiger U.S. Patent 2,340,955, or higher-solids-content aqueous dispersions of tackified rubber adhesives containing, as an essential ingredient, important quantities of finely divided mineral matter or like solids. Both of these types of aqueous dispersions of tacky adhesive have inherent disadvantages.

It is an important object of this invention to provide water dispersed tacky adhesives having an uniquely high solids-content of film-forming material, unique adhesive properties and unique utilities and to provide a process by which such aqueous dispersions can be produced.

It is another object of the invention to provide water dispersed tacky, or pressure sensitive, adhesives of the type set out above possessing characteristically excellent water and alkali resistance but, at the same time, having superior wet and dry adhesion to textiles, paper, metals, rubber, vinyl resins, glass and the like.

It is a special object of the invention to provide an aqueous dispersion of a tacky, or pressure sensitive, adhesive of a desired fluidity which, upon being applied, exhibits superior high early strength and ultimate strength of adhesion to surfaces, or intersurfaces, of non-porous, or substantial non-porous systems such as vinyl or bituminous floor tiles, or like floor tiles, expanded polystyrene or polyurethanes, polyethylene, terephthalate film, or like relatively non-porous materials.

It is another special object of this invention to provide a high solids-content aqueous dispersion of a tacky adhesive which will form a continuous, and homogenous, film on a substrate with a use of a minimum amount of the water dispersed tacky-adhesive.

It is yet another special object of this invention to provide an aqueous dispersion of a tacky adhesive of exceptionally high solids content which is free, or substantially free, of solid mineral matter or like solid fillers.

It is a particular object of the invention to provide an aqueous dispersion of a tacky adhesive which has such high solids content that the adhesive can be continuously applied to relatively non-porous material such as vinyl and like floor tile, continuously and promptly covered with a release sheet, such as polyethylene, continuously packaged for shipment and thereafter applied to a floor as to "do-it-yourself peel and stick" floor tile to provide a tiled floor in which the adhesive adheres to the tile more tenaciously than it does to the floor.

Other objects, features and advantages of the invention will become apparent from the more detailed description which follows.

An important factor contributing to an obtaining of the objects of this invention resides in the discovery that water dispersions of tacky adhesives derived from rubber latices and tackifiers for the latex containing at least 70% and up to 81%, and more, of solids as film-forming material can be obtained by providing an excess of an emulsifier in a conventional aqueous dispersion of the rubber latex, either at the time of the formation of the latex emulsion or thereafter, in a sufficient amount to emulsify the tackifying material to be added and thereafter adding the tackifier in a liquid, or fluid, phase under vigorous aggitation. In a special embodiment of the invention, conventional commercial aqueous dispersions of synthetic, or natural, or mixtures of rubber latices are purchased (normally containing little or no excess emulsifier) and the necessary amount of emulsifying agent, and additional water if necessary, is added before the tackifier material is added. Of course, the necessary excess emulsifier could be added when forming the latex emulsion or could be added conjointly with the tackifier resins although customarily neither of these procedures would be followed. If the desired high solids content is to be obtained it is important that the necessary emulsifying, or dispersing agent be provided in the latex emulsion at the time the tackifier liquids are added.

In the practice of this invention, known surface active emulsifiers, or dispensing agents, may be used. Such surface active agents must have, as is known, properly balanced lyophylic and hydrophilic properties. Emulsifiers, or suspending agents, which are strongly lyophilic and have only limited water solubility and yet can be dispersed in the aqueous phase of the water dispersion of the latex are preferred for they do not adversely affect the water resistance of the adhesive after it is set up to an unacceptable degree. Water soluble colloids, such as methyl cellulose, which are not surface active and depend on their colloidality for their suspending power should be completely avoided for they strongly adversely affect the water resistance of the adhesive after it has set.

Emulsifiers, or suspending agents found useful, and practically acceptable, in the practice of this invention include anionic materials such as various soaps, or soap-like, products, fatty acid ester sulfate, alkyl sulfates or, sulfonates, etc., and nonionic emulsifiers such as polyoxy-alkylated (typically polyoxyethylated) fatty acids, fatty alcohols, or alkyl phenols. From a practical viewpoint, cationic emulsifiers are less desirable. For instance one may use rosin soaps, stearic acid soaps, tall oil soaps, nonyl phenol polyethylene oxide, trimethylnonyl ether of polyethylene glycol and the like.

The types of rubbers used are those heretofore found suitable in the production of aqueous dispersion of tacky adhesives although the so-called SBR (styrene-butadiene) lactices have been found especially advantageous. Suitable rubbers include both natural or synthetic rubber or like elastomeric materials and their mixtures. For instance, in addition to the SBR type latices one may use latices, i.e., aqueous dispersions, of natural rubber, butadiene-acrylonitrile rubber, butadiene-isobutylene rubbers, isoprene-isobutylene (butyl) rubbers, polyisoprene, chloroprene rubbers, chlorinated butadiene (neoprene) rubber, etc., and their mixtures. Aqueous dispensions, or latices, of such rubbers are readily available in concentrations which will supply the tacky adhesives in the high solids content mentioned above after the introduction of the tackifiers for the rubbers. For example, water dispersions of natural rubber are available containing about 35-75% rubber solids while water dispersions of synthetic rubber are available containing from about 40-65%. Since the tacky adhesive need not contain more than about 10% rubber relative to the total film-forming adhesive material, it is apparent commercial latices are readily available which will enable one to obtain the desired high solids-content by adding to commercially available aqueous dispersions of rubber desired quantities of tackifiers, or tackifiers and oil extenders serving as softeners or plasticizers. If the commercially available latices do not supply sufficient water to disperse the necessary amount of tackifier, additional water may be added with the additional emulsifier or separately.

Likewise, the types of tackifiers used are those heretofore used although the so-called coal tar types of resins typified by coumarone-indene or those derived from cyclopentadiene; so-called natural resins typified by pinene polymers and like terpene polymers, esters of rosin acids with polyhydric compounds known as rosin ester resins, or gum rosins; and so-called petroleum resins such as the high molecular weight hydrocarbon derived from petroleum such as those derived from olefin monomers such as butylene or certain petroleum waxes, are preferred for economic and functional reasons. Other suitable tackifiers include paraindene or paracoumarone resins, fossil resins, hydrocarbon resins and the like.

Where fire resistance is a problem the resin itself or the monomer from which it is derived, or both may be halogenated, typically chlorinated. Such fire resistant tackifier resins include high molecular weight saturated resinous compounds known as chlorowax.

The only essential solid ingredients of the tacky adhesive dispersed in the water is the rubber and the tackifier therefor, for it is known most tackifiers are also plasticizers for rubber. The surface active dispersant will be retained also but, at most, will represent only a small percentage of the total solids content. In most instances, however, especially where the preferred high melting tackifiers are used, known oil softeners or plasticizers are added to the water dispersion of the rubber together with the tackifier. By dissolving high melting tackifiers such as terpenes, coumarone or like natural and coal tar resins in plasticizer oils, high melting tackifiers can be emulsified in the liquid phase at an acceptable temperature to form a part of the dispersed tacky adhesive film-forming material to thereby provide a tacky adhesive possessing superior temperature resistance. Certain low melting tackifiers impart sufficient plasticity without the conjoint use of oil softeners either for the resin tackifier or the rubber.

As in past practices, the tackifier resin customarily is used in quantities in excess of the rubber solids used. The ratio of tackifier to rubber usually ranges between 6:1 and 2:1. Where oil softeners, or plasticizers, are used past practices are followed also and usually ranges between 25% and 40% of the total amount of rubber and tackifier. Where the preferred high melting terpenes or coal tar resins are used known plasticizers therefor are used such as naphthenic oils and paraffin oils are avoided. In other relations, however, known mineral oil pasticizers for rubbers may be used. Since the oil is added together with the tackifier they both may be considered, or referred to as part of the tackifier, or plasticizer, content of the adhesive.

By vigorous agitation reference is had herein to the type of mixing which is something more than ordinary stirring and is characterized by mixing in a colloid mill typified by a Charlotte mill or other high speed mixer. The ingredients may be introduced into the mixing apparatus in a known way as by adding the water dispersion of latex and the liquid, or liquified, tackifier, or tackifier and oil, to the high speed mixer through proportioning pumps.

While a theory of the invention is considered unnecessary, it is believed, and visual observations confirm, the unique order and manner of introducing the tackifier, or tackifier and oil softener, into the water dispersion of the very finely divided rubber enables one to obtain a very stable emulsion of the tacky adhesive in which the very small particles of rubber in the aqueous emulsion pack the voids in the somewhat larger particles of the tackifier resin as it is emulsified.

In the preferred practice of this invention, as pointed out above, the only material dispersed in the body of water is the tacky adhesive film-forming substance. Surprisingly, even though films are tacky, they coalesce promptly upon application and form a continuous film. In this way, one may coat substrates, with continuous adhesive films of any desired thickness, even monomolecular films. In the most nearly analogous known prior art water dispersons of tacky adhesives the essential presence of mineral fillers and the lower adhesive content of the adhesive precludes the formation of very thin continuous films of adhesive material. In important applications the presence of significant quantities of mineral and like fillers for resins have proven deleterious.

The water dispersion of this invention, generally speaking, especially where anionic emulsifiers and the preferred tackifiers are used, are more stable when the pH of the aqueous emulsion is between about 10 and 11.5. Where the emulsifying agent does not supply this pH, the pH may be adjusted by adding an alkaline agent. Alkaline earth hydroxides such as sodium and potassium hydroxide or alkaline earth carbonates such as sodium carbonate are preferred for practical reasons. Where non-ionic emulsifiers are used pH adjustment normally is not necessary and lower pH's customarily are used.

Thus, in summary, the present invention provides an aqueous dispersion or a tacky adhesive containing, as the only essential ingredients, the tacky adhesive and the emulsifying agent necessary to emulsify the latex and the resin tackifier for the latex. This novel aqueous dispersion of tacky rubber-based adhesive has uniquely high solids-content of 70 to 81, or more and correspondingly a water content of only 30 to 19%, or somewhat less. Such an aqueous dispersion containing essentially only the tacky adhesive film-forming material and the emulsifier for the adhesive material have the advantages set out above. The amount of rubber used is that conventionally used in like less concentrated emulsions and constitutes about 5-25%, preferably about 8-15%, and typically about 10-11% of the film-forming solids in the aqueous emulsion. The amounts of tackifier relative to the amounts of rubber and the amount of oil relative to the amount of resin and rubber are those heretofore used and have been set out earlier herein. As is known, the amount of emulsifier necessary is quite small and under any circumstance would not exceed 5% of the total solids in the emulsion. The amount of emulsifier normally added to the latex emulsion varies between about 2.5 and 3.5% of the total solids content of the emulsion.

The following examples constituting purely exemplary embodiments in the invention, will further facilitate in understanding of the invention and its underlying principles.

Example I

A commercial chemical emulsifier in the form of a paste containing 65% of the sodium soap of rosin acids and known as Dresinate #731 (a product of Hercules Powder Company, Inc., Wilmington, Del.) was diluted with water, maintained at a temperature of about 140° F., until the rosin soap content was about 15%. The resulting solution was adjusted with KOH to a pH of 10.8 to 11.2. This aqueous solution of rosin soap was added to a commercial styrene-butadiene latex containing 62% by weight of the synthetic rubber solids of which 16% by weight was styrene; such a SBR rubber latex, known as Latex 2102, is available from Copolymer Rubber and Chemical Company, Baton Rouge, La.

The resulting latex containing the added emulsifier sufficient to emulsify the tackifying resin composition to be added thereto contained the following ingredients in percentages by weight.

| Ingredients: | Percent |
|---|---|
| Water—at 140° F. | 40.75 |
| Dresinate #731 (65% solids) | 11.8 |
| Potassium hydroxide solution (45% KOH) | 0.45 |
| Latex #2102 | 47.0 |
| | 100.00 |

Also, a plasticized and liquified terpene resin was prepared from a polymer of β-pinene having a melting point of 115° C. Such a resin is available from Pennsylvania Industrial Chemical Corp., Clairton, Pa., under the Piccolyte trade designation and is available with properties set out below.

The plasticizing oil used to plasticize the terpene resin was a high viscosity naphthenic oil obtainable from Atlantic Refining Company of Philadelphia, Pa., under the trade designation of LSE 850. Such oils have the properties set out below.

In order to plasticize and liquify the high melting terpene resin, the naphthenic oil was first introduced into a clean vessel equipped with a steam jacket and stirrer and thereafter the resin, in lumps not exceeding 1½″, was introduced into the vessel so that the vessel contained by weight 57% of a resin and 43% oil. The temperature was raised to 260–280° F. by passing steam through the jacket and the resin and oil were stirred until the resin was melted and blended with the oil. Steam temperature was reduced until the liquid blend had a temperature between 250–260° F.

The plasticized terpene resin at a temperature between 250–260° F. and the latex emulsion containing the added emulsifier at a temperature between 80–90° F. were then introduced into a colloid mill known as a Charlotte mill from service tanks for the resin-oil blend and emulsifier equipped with appropriate proportioning pumps which provided the resin and the latex with added emulsifier in a weight ratio of 61:39. The colloid mill was of a size suitable for the production of 50 to 1000 gallons per hour. The colloid mill readily converted the mixture into a stable emulsion having a temperature between 175–195° F.

By varying the proportions of plasticized resins and the water dispersion of emulsifier and SBR resin to the extent necessary from the specific embodiments set out above, water dispersions of tacky resins have been prepared having the following ingredients in the indicated percentage by weight.

| | Percent by Weight | | |
|---|---|---|---|
| | Low | Average | High |
| Composition: | | | |
| Piccolyte resin 115° C | 33.2 | 34.6 | 36.0 |
| Plasticizing oil LSE 850 | 25.0 | 26.1 | 27.2 |
| Dresinate #731 | 4.34 | 4.63 | 4.92 |
| Latex #2102 | 17.7 | 18.5 | 19.3 |
| Potassium hydroxide solids | 0.07 | 0.08 | 0.09 |
| Water | 15.3 | 16.09 | 16.8 |
| | | 100.00 | |
| | Low | Median | High |
| Properties: | | | |
| Solids | 73 | 75.5 | 77 |
| Viscosity Brookfield at 77° F. (#6 spindle, 20 r.p.m.) | 7,000 | 8,500 | 10,000 |
| pH | 10.5 | 10.75 | 11.0 |
| Weight gallon | 8.0 | 8.1 | 8.2 |
| Color | | pale lemon | |

The medium hard polyterpene resin used in this example had the physical and chemical properties listed below.

| | |
|---|---|
| Melting point ° C | 115 |
| Density | 0.98 |
| Color (Gardner) | 1–3 |
| Flash (COC) ° F. | 450 |
| Specific heat (0–100° C.) | 0.5 |
| Acid number | 0 |
| Saponification number | 0 |
| Ash, percent | About 0.1 |

The naphthenic plasticizing oil LES 850 had the following properties:

| | |
|---|---|
| Specific gravity at 60° F. | 0.92–0.95 |
| Viscosity SUS: | |
| 77° F. | 1800–2300 |
| 210° F. | 75–100 |
| Flash (COC) ° F. | 445 |
| Pour, ° F. | +10 |
| Color, ASTM | 3–6 |
| Aniline point, ° F. | 150–190 |

Instead of the sodium soap of rosin acids, the potassium soap sold under the Dresinate trade name as Dresinate #214 may be substituted with equivalent results.

The water dispersions of the tacky adhesive of this example are exceptionally stable in storage and possess surprising good wetting properties even for substantially non-porous materials, such as set out in the obectives of the invention, and the adhesive content promptly coalesces onto the applied surface to form a tacky adhesive film of high early strength and readily sets up to form a very flexible film of exceptional strength. For instance, the aqueous dispersions of this example can be coated into a vinyl asbestos tile, as by brushing, roller-coating or by spraying promptly coated with a release film, such as polyethylene, and immediately packed for shipping to the retail distributor. Upon removing the release film, the tacky resin, which will then be dry, will be pressure sensitive so that the tile may be easily positioned on a vertical, or, horizontal surface. Typically such laid tile will possess a shear strength of 70–80 lbs. in.$^2$ while a shear strength of 15 lbs. in.$^2$ is sufficient to meet standard requirements. In addition, should one wish to remove the tile for replacement, or repositioning, one would not experience difficulty for the adhesive typically would adhere to the tile more tenaciously than it would adhere to the surface upon which the tile is laid.

Examples II–V

Following the procedures set out in Example I and, using the same types of pinene resin, oil, latex, and emulsifying agents four additional aqueous dispersions of tacky adhesives were prepared by mixing appropriate proportions of the plasticized resin and latex to provide aqueous dispersion of tacky adhesives having the ingredient content and the properties set out below.

Alkali Co. of Cleveland, Ohio. The properties of these chlorinated paraffins are as follows:

|  | Paroil 170 | Chlorowax #70 |
| --- | --- | --- |
| Color Gardner | 3–4 | 1–2 |
| Sp. Gr. 25° C | 1.55 | 1.7 |
| Chlorine content, percent | 70 | 70 |
| Viscosity, SSU, 210° F | 500–600 |  |
| Melt point, ° C | (¹) | 90–100 |
| Free chlorine | (²) | (²) |

¹ Oil.
² None.

|  | Example | | | |
| --- | --- | --- | --- | --- |
|  | II | III | IV | V |
| Weight | Percent | Percent | Percent | Percent |
| Resin 125° C | 37.4 |  | 37.4 |  |
| Resin 115° C |  | 38.9 |  | 36.9 |
| Oil | 30.6 | 28.0 | 30.6 | 28.0 |
| Latex 2107 | 17.5 | 18.0 |  |  |
| Latex 2711 |  |  | 17.0 |  |
| 15% #731 soap | 14.5 | 15.1 | 15.0 | 17.6 |
| Latex 2102 |  |  |  | 17.5 |
| Shear Str. 1″ x 1″ 12″/min | 265# | 240# | 340# | 80# |
| Solids, percent | 80.0 | 80.5 | 79.0 | 78 |
| Percent Bound styrene in Latex solids | 44 | 44 | 59 | 16 |
| Percent Rubber Solids in composition | 10.7 | 10.8 | 9 | 10.7 |
| Pressure Sensitivity | (¹) | (²) | (³) | (⁴) |

¹ Fair.
² Medium.
³ Slight.
⁴ Very Good.

NOTE.—The emulsions had the properties listed below: Solids, 77.0–81.0; Viscosity cps. 77° F., 6,000–14,000; Particle size, 5 max.; Color, Pale lemon.

In the composition set out above a variance in the rubber ingredient in the direction of a high styrene content makes a system with comparable emulsion properties but of high ultimate strength. On the other hand, as is apparent from the above tabulation dry films of the adhesives containing the rubber with high styrene content possess lesser pressure sensitivity.

The emulsion set out above may be used in exactly the same manner as the emulsion of Example I and like results are achieved.

By varying the types of resin and the types and amounts of rubber the plasticity of the dry film may be varied and the shear strength thereof varied from 75 lbs./in.² with pressure sensitive properties to shear strengths of 350 lbs./in.² with good ductility.

Example VI

An aqueous solution of Dresinate 731 containing 15% solids was prepared, as described in Example I. This solution was blended with a styrene-butadiene latex containing 62% by weight of rubber solids, of which 44% is styrene (Latex 2107) to form a 50:50 blend emulsion.

A tackifying resin base was prepared by blending a chlorinated paraffin oil (Paroil 170) with a chlorinated paraffin resin (Chlorowax #70) in the weight ratio of 70:30.

The formed latex emulsion and the tackifying resinous blend were emulsified in 40:60 ratio in a colloid mill as in Example I.

The resulting water dispersion of the pressure sensitive adhesive had a slight tendency towards sedimentation so that 98.4% by weight of the dispersion was blended with 1.6% by weight of an aqueous solution of a sodium polyacrylate thickener containing 6½% by weight of the acrylate.

The resulting emulsion was very stable in storage and dried films thereof had properties comparable to those of the films in Example I but were, in addition, fire resistant.

Paroil 170 is a tradename for a chlorinated paraffin oil obtainable from Dover Chemical Corporation of Dover, Ohio, and Chlorowax #70 is a trade name for a resinous chlorinated paraffin obtainable from Diamond

Example VII

The formulation of Example I was varied by dissolving a coumarone-indene resin, having a melting point of 108.1° C., a specific gravity of 1.08, and a Gardner color index of 1.5 in an aromatic oil, namely a phenol-indene oil, having a softening point of 5–15° C., a boiling point between 300–370° C., a specific gravity of 1.07–1.09 and a Gardner color index of 2 maximum. Sufficient resin was dissolved to form a solution containing 52 parts by weight of resin and 48 parts by weight of phenol-indene oil. Both the resin and oil are available from Neville Chemical Company of Pittsburgh, Pa., under the respective designations of Neville R–11 and Nevillac 10°.

Sixty-five parts by weight of the plasticized tackifier resin set out above was emulsified, in a colloid mill as set out in Example I, with 35 parts by weight of a 50:50 blend of Latex 2102 and Dresinate #731 containing 15% solids. The resulting aqueous dispersion was stable and condensed about 75% solids.

When applied as described in Example I, such adhesives have a shear strength of about 70–120 lb./in.² depending on the type surfaces involved. They have excellent water resistance and are more resistant to aliphatic hydrocarbons than the adhesives of Example I.

While the invention has been illustrated by specific and detailed examples, it is not intended that these illustrative examples should be interpreted as limitations upon the invention. Numerous variations in the details of the preparation and formulation of the aqueous dispersion of the tacky adhesives hereof will appear to those skilled in the art and yet be within the scope and spirit of the invention as set out hereinbefore and as defined in the appended claims.

What is claimed is:

1. A process for producing an aqueous dispersion of a tacky adhesive having high solids content which comprises providing in an aqueous rubber latex dispersion a surface active agent in an amount sufficient to disperse in said latex a quantity of subsequently added liquid tackifier resin or liquid solution of a tackifier resin sufficient to tackify the rubber therein, and thereafter, through agitation and the dispersing effect of said surface active agent, emulsifying into said latex said quantity of said tackifier resin.

2. A process for producing a tacky adhesive having high solids content which comprises providing in an aqueous rubber latex dispersion a surface active emulsifier in an amount sufficient to emulsify in the aqueous phase of said latex a quantity of subsequently added liquid tackifier resin or liquid solution of a tackifier resin sufficient to tackify the rubber therein, and thereafter, through vigorous agitation and the emulsifying effect of said emulsifier, emulsifying into the aqueous phase of said latex said quantity of said tackifier resin and in a total amount sufficient to provide a total solids content of at least 70% of the weight of the aqueous dispersion.

3. A process for producing a tacky adhesive which comprises introducing into a rubber latex dispersion a surface active agent in an amount sufficient to emulsify in the aqueous phase thereof a quantity of subsequently added liquid tackifier resin or liquid solution of a tackifier resin sufficient to tackify the rubber therein, and thereafter, through agitation and the emulsifying effect of said agent emulsifying into the aqueous phase of said latex said quantity of said tackifier resin.

4. The process of claim 1, wherein the emulsifying agent is an anionic emulsifying agent and the latex emulsion has a pH between about 10 and 11.5.

5. The process of claim 1, wherein the tackifier resin is softened and plasticized with an oil, the emulsifying agent is a surface active compound and the emulsifying agent content and the tackified adhesive content of the aqueous dispersion together represents from about 70 to 81% of the weight of aqueous dispersion.

References Cited

UNITED STATES PATENTS

| | | | |
|---|---|---|---|
| 2,340,955 | 2/1944 | Geiger | 260—744 |
| 2,658,044 | 11/1953 | Anderson | 260—27 |
| 2,933,469 | 4/1960 | Depew | 260—28.5 |
| 3,015,638 | 1/1962 | Sergi | 260—29.7 |
| 3,108,980 | 10/1963 | Gwin et al. | 260—33.6 |

MORRIS LIEBMAN, *Primary Examiner.*

B. A. AMERNICK, *Assistant Examiner.*